DEVICE FOR AUTOMATICALLY DIVERTING TELEPHONE CALLS

Filed July 23, 1965

INVENTORS
EDWARD RUDO,
SIDNEY GERSTEIN,
ROBERT G. SMITH
BY Donald D. Denton
ATTORNEY

DEVICE FOR AUTOMATICALLY DIVERTING TELEPHONE CALLS

INVENTORS
EDWARD RUDO,
SIDNEY GERSTEIN,
ROBERT G. SMITH

BY Donald D. Denton
ATTORNEY

INVENTORS
EDWARD RUDO,
SIDNEY GERSTEIN,
ROBERT G. SMITH
BY Donald D. Denton
ATTORNEY United States Patent Office 3,445,604
Patented May 20, 1969

3,445,604

DEVICE FOR AUTOMATICALLY DIVERTING TELEPHONE CALLS

Edward Rudo, 5809 Jonquil Ave. 21215, Sidney Gerstein, 716 Glenwood Ave. 21212, and Robert G. Smith, 820 Glenwood Ave. 21212, all of Baltimore, Md.

Filed July 23, 1965, Ser. No. 474,415
Int. Cl. H04m 3/54, 3/58
U.S. Cl. 179—18 15 Claims

ABSTRACT OF THE DISCLOSURE

A device for automatically transferring a telephone call to one telephone located at a preselected site through another telephone also located at the same site to a freely selected remote telephone; the device includes the two telephones at the preselected site, a holding means for maintaining a telephone link between the other telephone and the freely selected telephone after a telephone link has been established between this telephone and the freely selected telephone and transfer means coupled to the two telephones for establishing a telephone link therebetween. The transfer means is actuated when a random, remotely located telephone establishes a telephone link with the one telephone. In this manner a call to one of the telephones is transferred via the other telephone to the freely selected telephone.

This invention is a device for automatically diverting or relaying a telephone call without utilizing special central telephone installations, central memory facilities or leased line circuits.

The prior art is replete with mechanical, electromechanical and electronic devices for diverting a telephone call from a primary telephone to a secondary telephone. One such prior known device requires the subscriber to preset an accessory unit, which is connected to his telephone, with the telephone number of a remote telephone. This accessory unit receives any incoming calls to the subscriber's telephone and diverts or routes the call to the remote telephone. This scheme requires the subscriber to (1) know precisely his destination, (2) know the telephone number at that destination, and (3) preset the remote telephone number into the accessory unit before he embarks there. This scheme in general is not practical, particularly for persons whose physical locations throughout the day or night are not precisely predictable.

Another prior known diverting device utilizes a permanently assigned identity number whereby the subscriber must insert intelligence relative to changes in his physical location to a central memory facility. This technique is, however, relatively complex and expensive, and for this reason impractical.

In the most part, the remaining prior known telephone call diverting techniques and devices are relatively complex and expensive. There is, therefore, a present and clear need for a simple, inexpensive, yet accurate device for diverting telephone calls from a primary to a secondary telephone. Such diverters must be simple to install, compatible with existing telephone systems, relatively inexpensive, and independent of central telephone facilities.

A telephone call diverting device according to this invention advantageously eliminates the aforementioned characteristics and aspects of prior art devices and techniques which in the most part are unsatisfactory and objectionable, and uniquely achieves the desirable characteristics heretofore delineated.

According to our invention, two separate telephones are used, one being the subscriber's regular telephone and the other being the subscriber's private telephone. These two telephones are connected at the subscriber's residence or place of business in such a manner that all incoming telephone calls to the subscriber's regular telephone during a selected period will be diverted from the subscriber's regular telephone through his private telephone to a selected remote telephone.

When the subscriber is physically displaced from the location of his regular telephone and wishes to have all incoming calls to his regular telephone diverted to a telephone at a remote location, he merely calls his private telephone. This procedure actuates a call hold device which in turn starts a timer motor and actuates a transfer and switching device. The timer motor establishes the time period during which any incoming calls to the regular telephone will be diverted through the private telephone to the remote telephone and is preset by the subscriber. The function of the transfer and switching device is to connect the incoming call to the private telephone which in turn couples the call to the remote telephone.

A voice operated xmitter (VOX) is also provided for detecting when the diverted telephone call has been completed whereupon it starts a second timer motor which at the completion of its timing cycle, resets the transfer and switching device, thus putting the diverter in condition for relaying any subsequent incoming calls.

The first timer motor will automatically disconnect the diverter at the end of its time cycle. This is achieved by deactuation of the call hold device which in turn deactuates the transfer and switching device and the VOX.

It is therefore a primary object of our invention to provide a telephone call diverter which is associated with the subscriber's regular telephone that will automatically receive an incoming call and connect the incoming call to a remotely located telephone.

Another object of our invention is to provide a telephone call diverter which is physically associated with the subscriber's regular telephone and actuated into operation by the subscriber calling his private telephone from a remotely located telephone which automatically establishes a telephone connection that will divert any calls subsequently made to the subscriber's regular telephone to the remotely located telephone during a predetermined period after the diverter is actuated.

Another object of our invention is to provide a telephone call diverter that automatically connects any call made to the subscriber's regular telephone to a selected remote telephone during a desired period, yet not requiring preselected subscriber location or central memory facilities.

Another object of our invention is to provide a telephone call diverter which is simple to install, compatible with existing telephone systems, relatively inexpensive, and independent of central telephone facilities.

These and further objects and advantages will become more apparent upon reference to the following description and claims and the appended drawings wherein:

Figure 1:
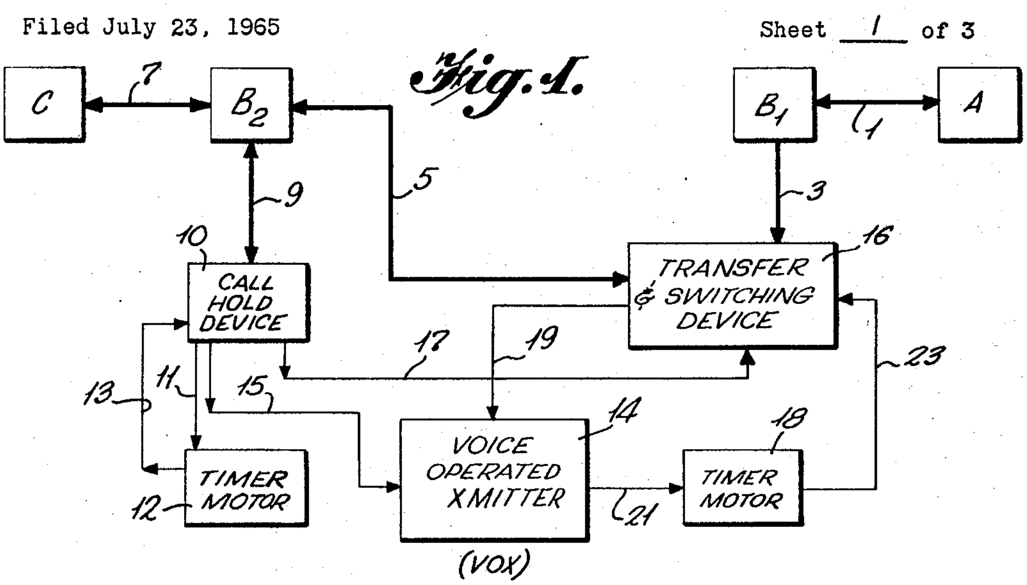
FIGURE 1 is a block diagram of an embodiment of the automatic diverter for telephone calls according to our invention.

FIGURE 1 is a block diagram of an embodiment of our novel automatic diverter for telephone calls, and graphically includes two conventional subscriber telephone sets, $B_1$ and $B_2$. Telephone $B_1$ is of the type having a listed or published telephone number, and shall hereinafter be referred to as the subscriber's regular telephone, while telephone $B_2$ is of the type which has an unlisted or unpublished telephone number, and shall hereinafter be referred to as the subscriber's private telephone.

The block A of FIGURE 1 represents any remote telephone which is linked for two-way communication with the subscriber's regular telephone $B_1$, while block C represents any remote telephone which is linked for two-way communication with the subscriber's private telephone $B_2$. The primary function of the diverter is to automatically provide a two-way communication link between the telephones A and C when telephone A calls telephone $B_1$.

It should be noted at this point that the communication link between telephones A and $B_1$, i.e., conductor means 1, is random; whereas the communication link between telephones C and $B_2$, i.e., conductor means 7, is pre-established by the subscriber. From an operational viewpoint, however, when the remote telephone A calls the subscriber's regular telephone $B_1$, the diverter will automatically provide a communication link between telephones A and C only if the subscriber has previously established a communication link between telephone C and the private telephone $B_2$.

The circuit connections of our diverter in accordance with the embodiment of FIGURE 1 are as follows:

The subscriber's private telephone $B_2$ is electrically coupled via conductor means 9 to a call hold device 10, which in turn is electrically coupled to (1) a timer motor 12 via conductor means 11, (2) a voice operated xmitter (VOX) 14 via conductor means 15, and (3) a transfer and switching device 16 via conductor means 17. Private telephone $B_2$ is also coupled to the transfer and switching device 16 via conductor means 5.

The subscriber's regular telephone $B_1$ is coupled via conductor means 3 to the transfer and switching device 16, which in turn is also coupled to the VOX 14 via conductor means 19. VOX 14 is coupled via conductor means 21 to a timer motor 18 which in turn is coupled to the transfer and switching device 16 via conductor means 23.

The diverter circuit is completed by connecting the timer motor 12 back to the call hold device 10 via conductor means 13.

Call hold device 10 is a complex relay mechanism which is actuated by the establishment of a two-way communication link between telephones C and $B_2$.

Timer motor 12 is preferably of the type having automatic reset capabilities and which can be adjusted for variable length time cycles. Motor 12 is capable of opening switching means when its time cycle expires, and is actuated by the call hold device 10.

VOX 14 is preferably and basically a multi-stage amplifier operating in the audio range of frequencies. It is capable of opening switching means in the absence of audio frequency signals at its input side. VOX 14 is controlled by the call hold device 10 and monitors the transfer and switching device 16.

The transfer and switching device 16 is a complex relay mechanism which is actuated by the call hold device 10. Its primary functions are to connect telephones $B_1$ and $B_2$, and couple the audio frequencies on telephone $B_1$ to the VOX 14.

Timer motor 18 is in all respects the same as timer motor 12 but has a relatively shorter time cycle. It is actuated by the VOX 14 and is capable of resetting the transfer and switching device 16.

It is to be understood at this point that the term "telephone" as used herein is not limited to conventional subscriber telephones, but includes electro, electro-magnetic or electronic circuits which are responsive to various communication signals transmittable over telephone lines.

The operation of the circuit of FIGURE 1 is as follows:

When the subscriber desires to have any incoming call to his regular telephone $B_1$ from the remote telephone A diverted to the remote telephone C, which is at a location remote from the regular telephone $B_1$, he telephones his private telephone $B_2$. The ringing impulse at telephone $B_2$ causes the call hold device 10 to be energized, which in turn causes three primary functions to occur.

First, the call hold device 10 actuates the timer motor 12, thus causing it to commence one time cycle of operation. As mentioned above, the length of the time cycle of the timer motor 12 is preset by the subscriber before he departs for a remote loction. For exemplary reasons only, let it be assumed that the timer motor 12 was preset for a one hour time cycle. As will be described in greater detail below, the call hold device 10 will remain energized so long as the timer motor 12 is running.

Second, the call hold device 10 actuates the VOX 14, for example, by connecting power via conductor means 15 to the amplifier and relay stages thereof. A detailed description of a preferred VOX circuit will be described below respecting the circuit of FIGURE 3.

Lastly, the call hold device 10 energizes the transfer and switching device 16 via conductor means 17.

Our diverter is now in condition to relay any incoming calls to the regular telephone $B_1$.

When the remote telephone A calls telephone $B_1$, the pre-actuated transfer and switching device 16 automatically connects regular telephone $B_1$ to the private telephone $B_1$, thus establishing a two-way communication link between telephones A and C via conductor means 1, telephone $B_1$, conductor means 3, transfer and switching device 16, conductor means 5, telephone $B_2$, and conductor means 7. In addition, the transfer and switching device 16 couples the audio signals in the telephone link between telephones A and C to the VOX 14 via conductor means 19. VOX 14 now monitors the telephone link between telephones A and C.

When the telephone link between telephones A and C is interrupted, i.e., the telephone call has been completed, the VOX 14 detects the absence of audio frequencies and energizes the timer motor 18 via conductor means 21.

When timer motor 18 completes its cycle of operation, which is short relative to the time cycle of timer motor 12, e.g., a minute or so, it de-energizes the transfer and switching device 16 via conductor means 23, thus placing device 16 in condition to transfer any subsequent calls made to telephone $B_1$.

At this point in the operation of the diverter, the telephone link between telephones $B_1$ and $B_2$ is broken as well as the electrical connection between the transfer and switching device 16 and the VOX 14. However, the call hold device 10 remains energized and both the VOX 14 and the transfer and switching device 16 remain energized so that the timer motor 12 continues to run through its time cycle.

Our diverter will be deactuated when the timer motor 12 completes its time cycle.

Figure 2:
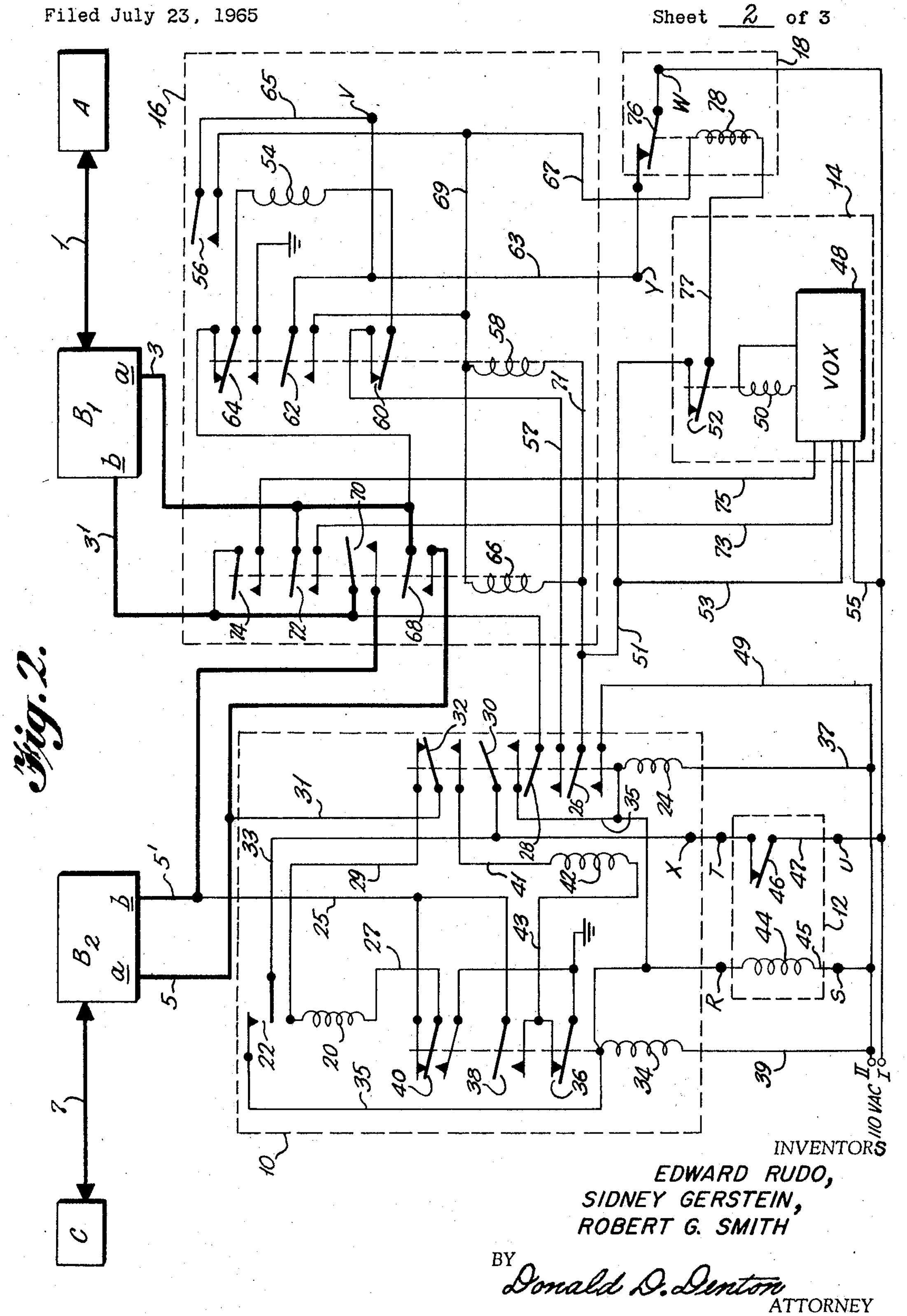
FIGURE 2 is a preferred detailed circuit of the present invention in accordance with the embodiment of FIGURE 1, with the conventional telephones and the voice operated xmitter (VOX) of the circuit shown in block diagram form.

FIGURE 2 depicts a preferred detailed circuit of the present invention in accordance with the embodiment of FIGURE 1. In this detailed circuit, the elements making up the blocks of FIGURE 1 are shown within the confines of dashed line blocks and are appropriately referenced with the same numerals as their corresponding blocks of FIGURE 1. Additionally, in this detailed circuit the conventional telephones A, $B_1$, $B_2$, and C and the VOX 14 are not shown in detail. A preferred detailed circuit for the VOX 14 will be described below regarding FIGURE 3.

The call hold device 10 comprises relay coil 20, which controls a single-pole, single-throw switch 22; relay coil 24, which controls single-pole, single-throw switches 26, 28 and 30 and a double-pole, single-throw switch 32; relay coil 34, which controls single-pole, single-throw switches 36 and 38 and double-pole single-throw switch 40; and voice retaining coil 42, which holds the private telephone $B_2$ connected to the remote telephone C.

The timer motor 12 is merely shown in schematic form wherein the motor coil 44 thereof controls an auxiliary single-pole, single-throw switch 46. Motor coil 44 has its one end connected to the No. II side of a 110 volt A.C. source and its other end connected to one side of the single-pole, single-throw switch 22 of the call hold device 10, while the single-pole, single-throw switch 46 has its one end connected to the No. I side of the 110 volt A.C. source and its other end connected to the other side of the single-pole, single-throw switch 22.

The VOX 14 comprises amplifier circuits 48 (not shown in detail), and a relay coil 50, which controls a single-pole, single-throw switch 52.

The transfer and switching device 16 comprises a relay coil 54 which controls a single-pole, single-throw switch 56; a relay coil 58, which controls single-pole, single-throw switches 60 and 62 and double-pole, single-throw switch 64; and a relay coil 66, which controls single-pole, single throw switches 68, 70, 72 and 74. The single-pole, single-throw switches 68 and 70 respectively connect the conductors 3 and 3' of the regular telephone $B_1$ to the conductors 5 and 5' of the private telephone $B_2$, while the single-pole, single-throw switches 72 and 74 couple the audio frequencies on conductors 3 and 3' to the VOX 14.

The timer motor 18 is also merely shown in schematic form wherein the motor coil 74 thereof controls an auxiliary single-pole, single-throw switch 76. Motor coil 74 is connected across single-pole, single-throw switch 52 of VOX 14.

The operation of the circuit of FIGURE 2 is as follows:

When the subscriber wishes to route all telephone calls made to his regular telephone $B_1$ during a specified period to the remote telephone C, he merely telephones his private telephone $B_2$. The ringing impulse at telephone $B_2$ energizes the relay coil 20 of the call hold device 10. The circuit for energizing coil 20 may be traced from the *a* communication terminal of private telephone $B_2$, conductors 5 and 25, the normally closed contacts of switch 40, conductor 27, relay coil 20, conductor 29, the normally closed contacts of switch 32, conductors 31 and 5' to the *b* communication terminal of private telephone $B_2$. The energization of coil 20 causes the normally open switch 22 to close.

When switch 22 closes, 110 volts A.C. is placed across the relay coils 24 and 34 of the call hold device 10 and across the motor coil 44 of the timer motor 12.

The energizing circuit for coils 24, 34 and 44 may be traced from the No. I side of the 110 volt A.C. source, conductor 47, switch 46, conductor 33, switch 22, conductor 35 to one end of each of the coils 24, 34 and 44, through the coils 24, 34 and 44, conductors 37, 39 and 45, respectively, to the No. II side of the 110 volt A.C. source.

When relay coils 24 and 34 are energized, the switch blades of switches 26, 28, 30 and 32 and the switch blades of switches 36, 38 and 40 swing downwardly from that shown in FIGURE 2, thus closing normally open switches 26, 28, 30, 36 and 38, and opening the normally closed contacts of switches 32 and 40 and closing the normally open contacts of the same switches.

When motor coil 44 is energized, timer motor 12 commences to run through one time cycle, which, for example, may be a one hour interval.

When switch 26 closes, the No. II side of the 110 volt A.C. source is applied to the VOX 14 via conductors 51 and 53, and applied to the transfer and switching device 16 via conductor 71. Note that the No. I side of the 110 volt A.C. source is applied to the VOX 14 via conductor 55 and to the transfer and switching device 16 via the normally closed switch 76 and conductor 63.

When switch 28 closes, the regular telephone $B_1$ is coupled across the coil 54. By this arrangement, when the ringing impulse caused when remote telephone A calls the regular telephone $B_1$ occurs, the coil 54 will be energized, thus activating the transfer and switching functions of the transfer and switching device 16. This circuit may be traced from the *a* terminal of the regular telephone $B_1$, conductors 3 and 59, the normally closed contacts of switch 64, coil 54, the normally closed contacts of switch 60, conductor 57, switch 28, conductors 61 and 3' to the *b* terminal of regular telephone $B_1$.

When switch 30 closes, the 110 volt A.C. source is held across the coils 24, 34 and 44, thus releasing these coils from depending upon switch 22 being closed to remain energized. This circuit may be traced from the No. I side of the 110 volt A.C. source, conductor 47, switch 46, conductor 33, switch 30, conductor 35 to one end of each of the coils 24, 34 and 44, through these coils, conductors 37, 39 and 45, respectively, to the No. II side of the 110 volt A.C. source.

The switches 32, 36 and 38 jointly function to energize the voice retaining coil 42. This is accomplished by first removing ground from one end of coil 42 via the opening of normally closed switch 36, and then placing coil 42 across the *a* and *b* terminals of the private telephone $B_2$ via the closing of normally open switches 32 and 38. This circuit may be traced from the *a* terminal of the private telephone $B_2$, conductors 5 and 25, normally open switch 38, conductor 43, coil 42, conductor 41, the normally open contacts of switch 32, conductors 31 and 5' to the *a* terminal of private telephone $B_2$.

The switches 32 and 40 jointly function to de-energize coil 20. This is accomplished by removing the line voltage from across coil 20 via the opening of the normally closed contacts of switches 32 and 40 and by grounding one end thereof via the closing of the normally open contacts of switch 40. This circuit can be traced from the now opened contacts of switch 32, conductor 29, coil 20, conductor 27, the now closed contacts of switch 40, to ground.

The diverter is now in condition to divert any calls into the regular telephone $B_1$ to the remote telephone C for the time cycle of timer motor 12.

It should be noted here that at the expiration of the time cycle of timer motor 12, normally closed switch 46 is opened, thus removing the 110 volt A.C. source to VOX 14 and to the transfer and switching device 16 by virtue of switch 26 returning to its normally open condition.

When remote telephone A calls the subscriber's regular telephone $B_1$, the ring impulse coil 54 is energized, thus causing the normally open switch 56 to close. The circuit for energizing coil 54 may be traced from the *a* terminal of the regular telephone $B_1$, conductors 3 and 59, the normally closed contacts of switch 64, coil 54, the normally closed contacts of switch 60, conductor 57, switch 28, conductors 61 and 3' to the *b* terminal of telephone $B_1$.

The closing of switch 56 connects the relay coils 58 and 66 across the 110 volt A.C. source, thus energizing these coils. The circuit for this operation may be traced from the No. I side of the 110 volt A.C. source, normally closed switch 76, conductors 63 and 65, switch 56, conductors 67 and 69, through both of the coils 58 and 66, conductor 71, switch 26, conductor 49 to the No. II side of the 110 volt A.C. source.

When relay coils 58 and 66 are energized, the switch blades of switches 60, 62, 68, 70, 72 and 74 and the switch blade of switch 64 swing downwardly from that shown in FIGURE 2, thus opening the normally closed switch 60, closing the normally open switches 62, 68, 70, 72 and 74, and opening the normally closed contacts of switch 64 and closing the normally open contacts of that same switch.

When switch 60 opens, coil 54 is removed from across the $a$ and $b$ terminals of regular telephone $B_1$. At the same time, coil 54 is grounded through the normally open contacts of switch 64, thus effectively discharging this coil. Although switch 56 returns to its normally open condition when coil 54 is de-energized, switch 62 holds the coils 58 and 66 energized, i.e., it connects these coils across the 110 volt A.C. source. This circuit may be traced from the No. I side of the 110 volt A.C. source, switch 76, conductor 63, switch 62, through both of the coils 58 and 66. conductor 71, switch 26, conductor 49 to the No. II side of the 110 volt A.C. source.

When normally open switches 68 and 60 close, the $a$ and $b$ terminals of the regular telephone $B_1$ are respectively connected to the $a$ and $b$ terminals of the private telephone $B_2$ via conductors 3–3′ and 5–5′. By this operation, the transfer and switching device 16 operates to close the communication link between the telephones $B_1$ and $B_2$ and in effect relays the telephone call from remote telephone A to the remote telephone C.

The next function of the diverter is to monitor the communication link between the telephones A and C and to reset the transfer and switching device 16 at the completion of this telephone call. This function is achieved as follows:

When switches 72 and 74 close, the $a$ and $b$ terminals of the regular telephone $B_1$ are connected to the VOX 14 via conductors 73 and 75, thus coupling the audio frequencies thereon into the amplifier circuits 48 of the VOX 14. It will be recalled that at this moment power is applied to the VOX 14 via conductors 53 and 55 when the relay coil 24 is energized.

The amplifier circuits 48 are adapted to develop an output across the relay coil 50 which will open the normally closed switch 52 whenever audio frequencies are coupled thereto, i.e., when there is a communication link between telephones A and C.

When switch 52 is open, the timer motor 18 is de-actuated and automatically reset. In this respect, so long as switch 52 remains open, the timer motor 18 cannot run through its time cycle.

When the communication link between telephones A and C is broken, the flux field of coil 50 collapses and switch 52 returns to its normally closed condition. At this time, timer motor 18 is actuated and when it completes its time cycle, switch 76 is caused briefly to open. The time cycle of timer motor 18 may be in the neighborhood of fifteen seconds to a few minutes, so that short intervals of silence on the communication link between telephones A and C will not result in switch 76 being prematurely opened. Other desirable time constants may be provided to accommodate varying forms of communications between telephones A and C. Additionally, audio frequency sensitivity may be excluded and a tone or reset frequency used to actuate the VOX 14 when the communication link between telephones A and C is broken.

When switch 76 is opened, the No. I side of the 110 volt A.C. source is removed from the transfer and switching device 16. This in effect de-energizes coils 58 and 66 and returns their related switches to their normal positions.

The VOX 14, transfer and switching device 16 and timer motor 18 are each in their proper circuit condition to divert any subsequent telephone calls received by telephone $B_1$ to the remote telephone C.

As mentioned above, the diverter of FIGURE 2 is de-energized by timer motor 12. This is perfected when timer motor 12 completes its time cycle and opens switch 46. This results in the No. II side of the 110 volt A.C. source being removed from the call hold device 10, thus de-energizing coils 24 and 34. When this occurs, the switches in the call hold device 10 return to their normal positions, thus removing power from the VOX 14 and transfer and switching device 16. The diverter is thus de-energized and will not relay telephone calls until such time as the subscriber once again calls his private telephone $B_2$ from a remote telephone.

It is to be noted that signal responsive means may be provided at the remote telephone C for determining when the remote telephone A calls the regular telephone $B_1$. Such signal responsive means may be in the conventional form of a large "pick-up" coil with associated signal developing means, i.e., amplifier and bell or buzzer. For example, the signal responsive means may be inductively coupled to the remote telephone C and responsive to audio frequencies or any other signal in the telephone link which are developed when the transfer and switching device 16 is energized. In this respect the impulse set up by closing of switches 68, 70, 72 and 74 will serve as a signal which may be picked up at telephone C.

Figure 3:
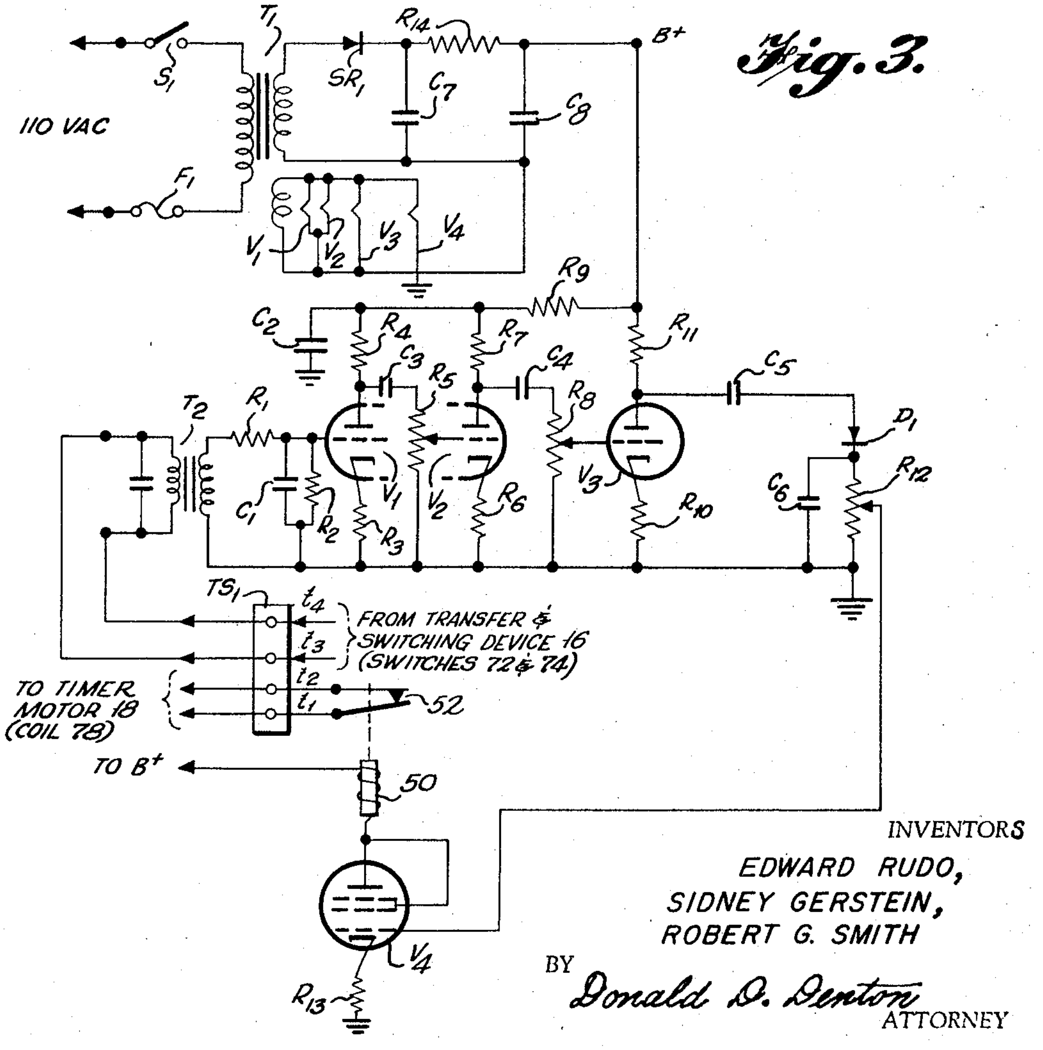
FIGURE 3 is a detailed circuit of a preferred embodiment of a voice operated xmitter (VOX) which may be used in the circuits of FIGURES 1 and 2.

FIGURE 3 depicts a detailed circuit of a preferred embodiment of a voice operated xmitter (VOX) which may be utilized as the VOX 14 of FIGURES 1 and 2.

VOX 14 is basically a multi-stage amplifier and is preferably tuned to audio frequencies. It has its own power supply circuit for developing B+ and filament voltages, and has transformer input coupling matched to the telephone line impedance, e.g., a 600 ohm input transformer.

VOX 14 comprises three triode vacuum tube amplifiers having triode sections $V_1$ and $V_2$ in one duo-triode vacuum tube and triode section $V_3$ in a single vacuum tube; a pentode vacuum tube amplifier $V_4$; a power transformer $T_1$; and audio frequency input transformer $T_2$; and the relay coil 50 and its associated single-pole, single-throw switch 52.

The power transformer $T_1$ has one end of its primary connected to the No. I side of the 110 volt A.C. source via an ON-OFF switch $S_1$, while its other end is connected to the No. II side of the 110 volt A.C. source via a fuse $F_1$.

Transformer $T_1$ has two secondaries, one for developing the B+ voltage and the other for developing filament voltages for the cathodes of triodes $V_1$, $V_2$, $V_3$ and $V_4$ and for the cathode of pentode $V_5$. The upper secondary of transformer $T_1$ has one end connected to ground and the other end connected to the B+ terminal via a series circuit comprising a silicon rectifier $SR_1$ and a limiting resistor $R_{14}$. Conventional filter capacitors $C_9$ and $C_{10}$ are connected between ground and the ends of limiting resistor $R_{14}$.

The circuit of the upper secondary of transformer $T_1$ is commonly called a half-wave rectifier and for that reason any well known half-wave rectifier may be used in lieu thereof for developing the necessary B+ voltage.

The lower secondary of transformer $T_1$ develops the necessary filament voltages in a conventional manner as is graphically shown by the filaments numeraled $v_1$ through $v_4$.

The audio input transformer $T_2$ is connected to terminals $t_3$ and $t_4$ of the terminal strip $TS_1$ and it is these terminals upon which the input signals being monitored are present. By way of example, terminals $t_3$ and $t_4$ are shown to be connected to the single-pole, single-throw switches 72 and 74 of the transfer and switching device 16 of FIGURE 2.

As mentioned above, normally open switches 72 and 74 are closed when the remote telephone A calls the regular telephone $B_1$, thus coupling the audio signals thereon to the VOX 14.

Audio input transformer $T_2$ has its primary connected across terminals $t_3$ and $t_4$, whereas one end of its secondary is connected to the control grid of the triode $V_1$ via limiting resistor $R_1$, while the other end of its secondary is grounded.

The triode $V_1$ is connected in circuit as follows:

The control grid is connected to ground via grid-leak resistor $R_2$ and bypass capacitor $C_1$; the cathode is connected to ground via cathode bias resistor $R_3$; and its anode is connected to B+ via the load resistors $R_4$ and $R_9$. The capacitor $C_2$ in the anode circuit of triode $V_1$ is a conventional filter capacitor.

The amplified output signals of triode $V_1$ are developed across resistors $R_4$ and are coupled to the control grid of triode $V_2$ via the series connected capacitor $C_3$ and center-tapped resistor $R_5$. The slider of resistor $R_5$ is connected to the control grid of triode $V_2$.

Triode $V_2$ is connected in the circuit of FIGURE 3 as follows:

The control grid is connected to ground via the lower section of resistor $R_5$, which functions as a grid-leak resistor; the cathode is connected to ground via cathode bias resistor $R_6$; and the anode is connected to B+ via load resistors $R_7$ and $R_9$.

The amplified output signals of triode $V_2$ are developed across resistor $R_7$ and are coupled to the control grid of triode $V_3$ via the series connected capacitor $C_4$ and center-tapped resistor $R_8$. The slider arm of resistor $R_8$ is connected to the control grid of triode $V_3$.

Triode $V_3$ is connected in the circuit of FIGURE 3 as follows:

The control grid is connected to ground via the lower section of resistor $R_8$, which also functions as a grid-leak resistor; the cathode is connected to ground via cathode bias resistor $R_{10}$; and the anode is connected to B+ via the load resistor $R_{11}$.

The amplified output signals are developed across load resistor $R_{11}$ and are coupled via coupling capacitor $C_5$ to the anode of diode $D_1$, which has its cathode connected to ground via center-tapped resistor $R_{12}$. A bypass capacitor $C_6$ is connected across resistor $R_{12}$. The slider arm of resistor $R_{12}$ is connected to the control grid of pentode $V_4$.

Referring now to the output pentode $V_4$, this vacuum tube has its control grid connected to the slider arm of resistor $R_{12}$; its cathode connected to ground via resistor $R_{13}$; its screen electrodes conventionally biased by directly connecting them to the anode of pentode $V_4$; and its anode connected to B+ via relay coil 50.

The operation of the circuit of FIGURE 3 is as follows:

In the absence of audio signals at the input terminals $t_3$ and $t_4$ of terminal strip $TS_1$, the circuit must be first adjusted so that the current flow through relay coil 50 (which may be no current flow at all) is insufficient to open the normally closed switch 52.

With ON-OFF switch $S_1$ closed, there are three adjustments to be made. First, resistor $R_5$ is adjusted for desirable gain control; second, resistor $R_8$ is adjusted for desirable amplifier sensitivity; and last, resistor $R_{12}$ is adjusted for providing the desirable control grid bias for the output pentode $V_4$. The foregoing adjustments are made so that normally closed switch 52 will remain closed in the absence of audio signals at the input terminals $t_3$ and $t_4$; whereas switch 52 will be opened by relay coil 50 when audio signals are present.

When audio signals are present at terminals $t_3$ and $t_4$, they are amplified by triodes $V_1$, $V_2$ and $V_3$, whereupon a threshold bias voltage is developed across resistor $R_{12}$ and coupled to the control grid of pentode $V_4$. This causes the pentode $V_4$ to conduct heavily and thus draw more anode current thereby causing the relay coil 50 to develop a flux field sufficient to open the normally closed switch 52.

It will be recalled that switch 52 is connected in series with the motor coil 78 of the timer motor 18, and for this reason when switch 78 opens, the timer motor 18 is prevented from running through its time cycle.

When audio signals are no longer present on input terminals $t_3$ and $t_4$, to wit, the diverted telephone call between telephones A and C is completed, the bias voltage developed across resistor $R_{12}$ drives pentode $V_4$ into a low conducting or nonconducting state, thus no longer drawing sufficient current to hold the switch 52 open.

When switch 52 returns to its normally closed condition motor coil 78 is energized and timer motor 18 commences to run through its time cycle, the completion of which causes switch 76 to open, thus de-energizing the diverter as above described in detail respecting the circuits of FIGURES 1 and 2.

Figure 4:
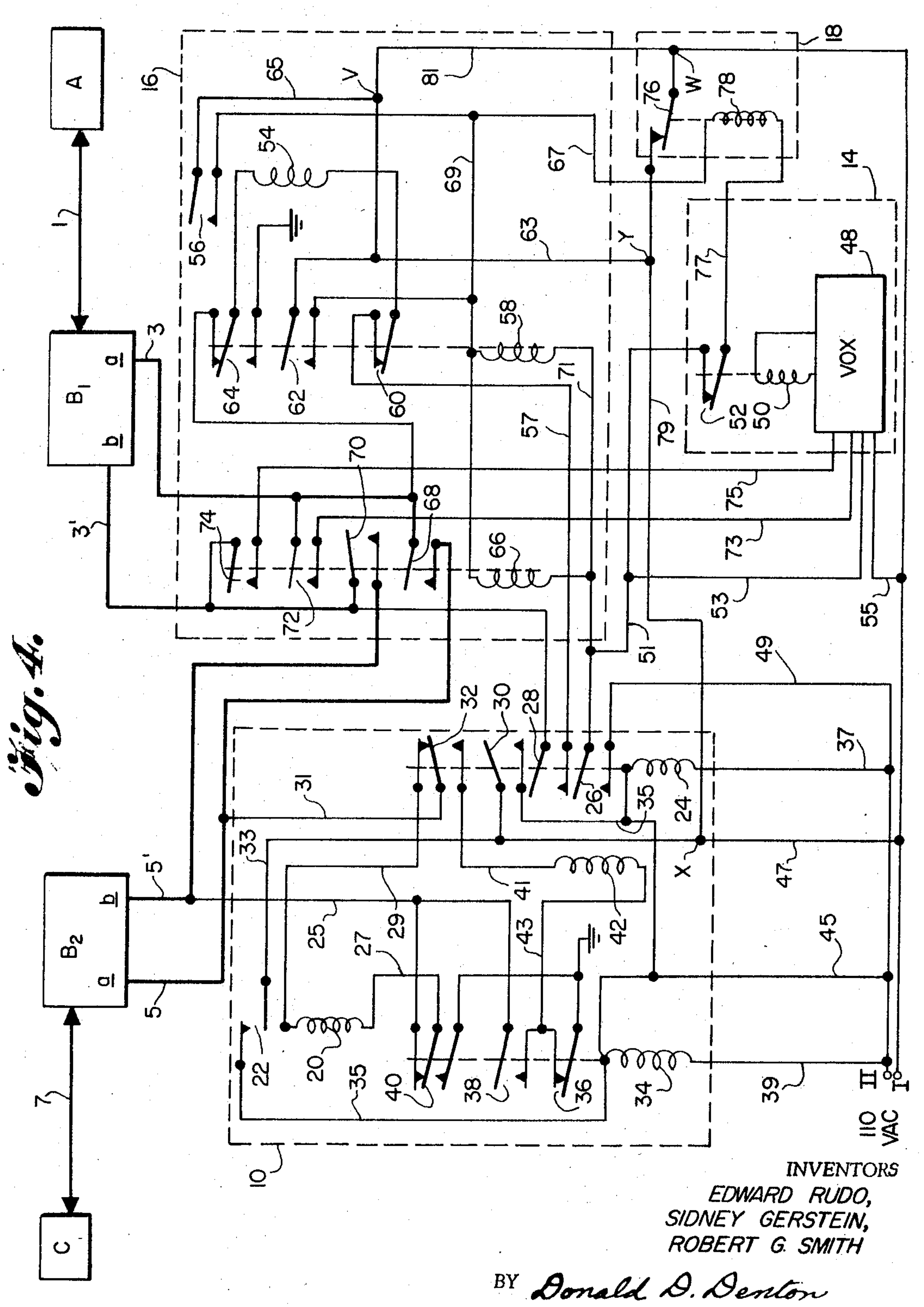
FIGURE 4 is a detailed circuit of an alternate embodiment of the embodiment of the present invention shown in FIGURE 2.

Referring to FIGURE 4, there is shown an alternate embodiment of our invention wherein our diverter is adapted to reset itself automatically without utilizing a predetermined time period such as provided by the timer motor 12.

This embodiment of our invention entails the removal of the timer motor 12 and the inclusion of conductors 79 and 81.

Timer motor 12 is disconnected from the circuit at terminals R, S, T and U while conductor 79 is connected between terminals X and Y and conductor 81 between terminals V and W.

The remaining circuit elements of the circuit of FIGURE 4, operate in the same manner as above described in detail respecting FIGURE 2, except as follows:

When the subscriber calls his private telephone $B_2$ the ringing impulse again energizes the relay coil 20 of the call hold device 10. This causes the normally open switch 22 to close, thereby energizing relay coils 24 and 34.

It should be noted here that the motor coil 44 is no longer in circuit and our diverter will not be de-energized after a predetermined time period.

The switches associated with coils 24 and 34 operate in precisely the same manner as above described, and the VOX 14, transfer and switching device 16 and timer motor 18 are energized so that our diverter is in condition to divert any calls into the regular telephone $B_1$ to the remote telephone C.

It should be noted here that normally closed switch 76 of timer motor 18 is now also connected across relay coils 24 and 34 via switch 30. Therefore, when switch 76 opens, coils 24 and 34 will be de-energized and our diverter deactivated.

As described above in detail, normally closed switch 76 opens when VOX 14 detects the absence of communication signals in the telephone link between remote telephones A and C; or to say it otherwise, when either telephone A or C breaks communication with the other telephone.

It will be apparent here that the removal of the timer motor 12 and the inclusion of conductors 79 and 81 advantageously permits our diverter to relay any incoming calls to the regular telephone $B_1$ after remote telephone C calls the private telephone $B_2$ and to automatically reset itself after the telephone link between remote telephones A and C is completed.

This alternate embodiment of our invention uniquely permits the subscriber to activate the diverter from a remote location without a time period limitation during which calls will be diverted to the remote location.

A unique feature of this alternate embodiment is that the diverter may be deactivated from a remote location by merely disconnecting the telephone link between remote telephone C and private telephone $B_2$ and calling the regular telephone $B_1$. This operation activates the transfer and switching device 16, connects the VOX 14 in circuit and causes the timer motor 18 to run through its time cycle, the completion of which opens switch 76 and shuts down the diverter.

For exemplary purposes only, the following elements were found to be highly satisfactory for assembly of our diverter:

| Relays: | Potter & Brumfield model and value |
|---|---|
| 20 | MB3D 110 v. DC. |
| 24 | GA 17A 115 v. AC. |
| 34 | GA 17A 115 v. AC. |
| 42 | MR 24 v. DC. |
| 50 | LM 11 5000 6.3 ma. |
| 54 | MB3D 110 v. DC. |
| 58 | GA 17A 115 v. DC. |
| 66 | GA 17A 115 v. AC. |

Timer motor 12—Haydon Co., Torrington, Conn., Mod. BR10–03
Timer motor 18—Haydon Co., Torrington, Conn., Mod. DA21–001

Resistors: [1]

| | | |
|---|---|---|
| $R_1$ | ohms | 47,000 |
| $R_2$ | megohms | 2.2 |
| $R_3$ | ohms | 2,200 |
| $R_4$ | do | 100,000 |
| $R_5$ | do | [2] 100,000 |
| $R_6$ | do | 2,200 |
| $R_7$ | do | 100,000 |
| $R_8$ | do | [2] 100,000 |
| $R_9$ | do | 22,000 |
| $R_{10}$ | do | 2,200 |
| $R_{11}$ | do | 100,000 |
| $R_{12}$ | megohms | 7.5 |
| $R_{13}$ | ohms | 1,500 |
| $R_{14}$ (1 watt) | do | 470 |

| Capacitors: [3] | Microfarads |
|---|---|
| $C_1$ | .001 |
| $C_2$ (450 volt, electrolytic) | 20 |
| $C_3$ | .01 |
| $C_4$ | .01 |
| $C_5$ | .01 |
| $C_6$ | .1 |
| $C_7$ (450 volt, electrolytic) | 20 |
| $C_8$ (450 volt, electrolytic) | 20 |

Transformers:

| | |
|---|---|
| $T_1$ | 125 volt, 50 ma., 6.3 volts, 2 amps. |
| $T_2$ | 600 ohm primary, 60,000 ohm secondary. |

Vacuum tubes:

| | |
|---|---|
| $V_1$ and $V_2$ | 12AX7 |
| $V_3$ | 6AB4 |
| $V_4$ | 6AU6 |

Diode:

| | |
|---|---|
| $D_1$ | 1N463A |

[1] One-half watt, 10%, unless otherwise stated.
[2] Audio-taper potentiometer.
[3] Ceramic disk, 500 volt, unless otherwise stated.

It will be apparent from the foregoing detailed description and operation of the preferred embodiment of our invention as depicted in the accompanying drawings, that our diverter will automatically receive an incoming call to the regular telephone and connect the incoming call to a remotely located telephone, and will function during a predetermined yet not preselected period.

A most desirable feature of our diverter is its capability to automatically divert telephone calls during a desired period, yet not require preselected subscriber location or central memory facilities. Our diverter is desirably simple to install, compatible with existing telephone systems, relatively inexpensive and independent of central telephone facilities.

The terms and expressions which have been employed herein are used as terms of description and not of limitation and it is not intended, in the use of such terms and expressions, to exclude any equivalents of the features shown and described, or portions thereof, but it is recognized that various modifications are possible within the scope of the present invention.

Without further elaboration, the foregoing is considered to explain the character of the present invention so that others may, by applying current knowledge, readily adapt the same for use under varying conditions of service while still retaining certain features which may properly be said to constitute the essential items of novelty involved, which items are intended to be defined and secured by the appended claims.

What is claimed is:

1. An automatic communication diverter comprising, in combination:
(a) first and second communication devices located at a preselected site;
(b) first means for maintaining a communication link between said first device and a preselected, remotely located communication device after said preselected remote device establishes communication with said first device; and
(c) second means being actuated by said first means after communication is established between the first device and the preselected, remotely located communication device, said second means establishing a communication link between said first and second devices when a random, remotely located communication device establishes communication with said second device to thereby provide a communication link between said remote devices through said first and second devices.

2. The automatic communication diverter in accordance with claim 1 and further including:
(a) means for detecting a predetermined condition in the communication link between said remote devices; and
(b) timer means for disconnecting the communication link between said first and second devices after said predetermined condition is detected.

3. The automatic communication diverter in accordance with claim 2 and further including other timer means operatively associated with said first device and said second means, said other timer means disconnecting the communication link between said first device and said preselected remote device at the completion of a finite period after the preselected remote device has established a communication link with the first device and at the same time deactuating the second means to thereby disconnect said diverter.

4. The automatic communication device in accordance with claim 2 in which said timer means also disconnects the communication link between said first device and said preselected remote device after said predetermined condition is detected, thereby disconnecting said diverter.

5. The automatic communication device in accordance with claim 1 and further including means associated with said preselected remote device for indicating when said random remote device has established a communication link with said first communication device.

6. An automatic diverter for communication signals comprising, in combination:
(a) first and second telephones located at a preselected site;
(b) holding means coupled to said first telephone for maintaining a telephone link between said first telephone and a preselected, remotely located telephone after said preselected remote telephone establishes a communication link with said first telephone; and
(c) transfer means coupled between said first and second telephones for establishing a telephone link therebetween when a random, remotely located telephone establishes a telephone link with said second telephone, thereby providing a telephone link between said remote telephones through said first and second telephones.

7. The automatic diverter in accordance with claim 6, and further including:
(a) monitoring means coupled to said transfer means for detecting the absence of communication signals in the telephone link between said remote telephones; and
(b) first deactuating means coupled to said monitoring means for de-energizing said transfer means after no communication signals are detected by said monitoring means, thereby disconnecting the telephone link between said first and second telephones when said random remote telephone completes its call to said second telephone.

8. The automatic diverter in accordance with claim 7 in which said deactuating means also disconnects the communication link between said first telephone and said preselected remote telephone after no communications signals are detected by said monitoring means, thereby disconnecting said diverter.

9. An automatic diverter in accordance with claim 8 in which said holding means energizes said transfer means and monitoring means when said preselected remote telephone calls said first telephone, thereby placing said diverter operative to provide a telephone link between said remote telephones through said first and second telephones when said random remote telephone establishes a communication link with said second telephone.

10. The automatic diverter in accordance with claim 9 in which:

(a) said holding means include actuating coil means which are energized when said preselected remote telephone establishes a communication link with said first telephone; and (b) said actuating coil means control switches which simultaneously connect a source of potential to said transfer means and monitoring means only when said actuating coil means are energized.

11. The automatic diverter in accordance with claim 10 in which:

(a) said transfer means include transfer coil means which are energized when said random remote telephone establishes a communication link with said second telephone; and (b) said transfer coil means control switches which connect said first and second telephones and couple said communication signals to said monitoring means only when said transfer coil means are energized.

12. The automatic diverter in accordance with claim 11 in which:

(a) said monitoring means include an amplifier operating in the audio frequency range; and (b) said communication signals in the communication link between said remote telephones are in the audio frequency range.

13. An automatic diverter for communication signals comprising, in combination:

(a) first and second telephones located at a preselected site;

(b) holding means coupled to said first telephone for maintaining a telephone link between said first telephone and a preselected, remotely located telephone after said preselected remote telephone establishes a communication link with said first telephone;

(c) transfer means coupled between said first and second telephones for establishing a telephone link therebetween when a random, remotely located telephone establishes a telephone link with said second telephone, thereby providing a telephone link between said remote telephones through said first and second telephones;

(d) monitoring means coupled to said transfer means for detecting the absence of communication signals in the telephone link between said remote telephones;

(e) first deactuating means coupled to said monitoring means for de-energizing said transfer means after no communication signals are detected by said monitoring means, thereby disconnecting the telephone link between said first and second telephones when said random remote telephone completes its call to said second telephone; and (f) second deactuating means coupled to said holding means for de-energizing said holding means and disconnecting said diverter at the completion of a finite period after said preselected remote telephone establishes a communication link with said first telephone.

14. The automatic diverter in accordance with claim 13 in which said first and second deactuating means each include a timer motor that is adjustable for variable length time cycles and automatically resetable.

15. The automatic diverter in accordance with claim 14 in which the time cycle of the timer motor of said second deactuating means is relatively longer than the time cycle of the timer motor of said first deactuating means.

References Cited

UNITED STATES PATENTS 1,965,123 7/1934 Kardorff ............. 179—18

KATHLEEN H. CLAFFY, *Primary Examiner.*

A. H. GESS, *Assistant Examiner.*